April 30, 1940.    L. DE FLOREZ    2,199,256
DIRECTIONAL INDICATION AND CONTROL
Filed Sept. 27, 1937    4 Sheets-Sheet 1

LUIS DE FLOREZ
INVENTOR

BY *Philip J. McKean*
ATTORNEY

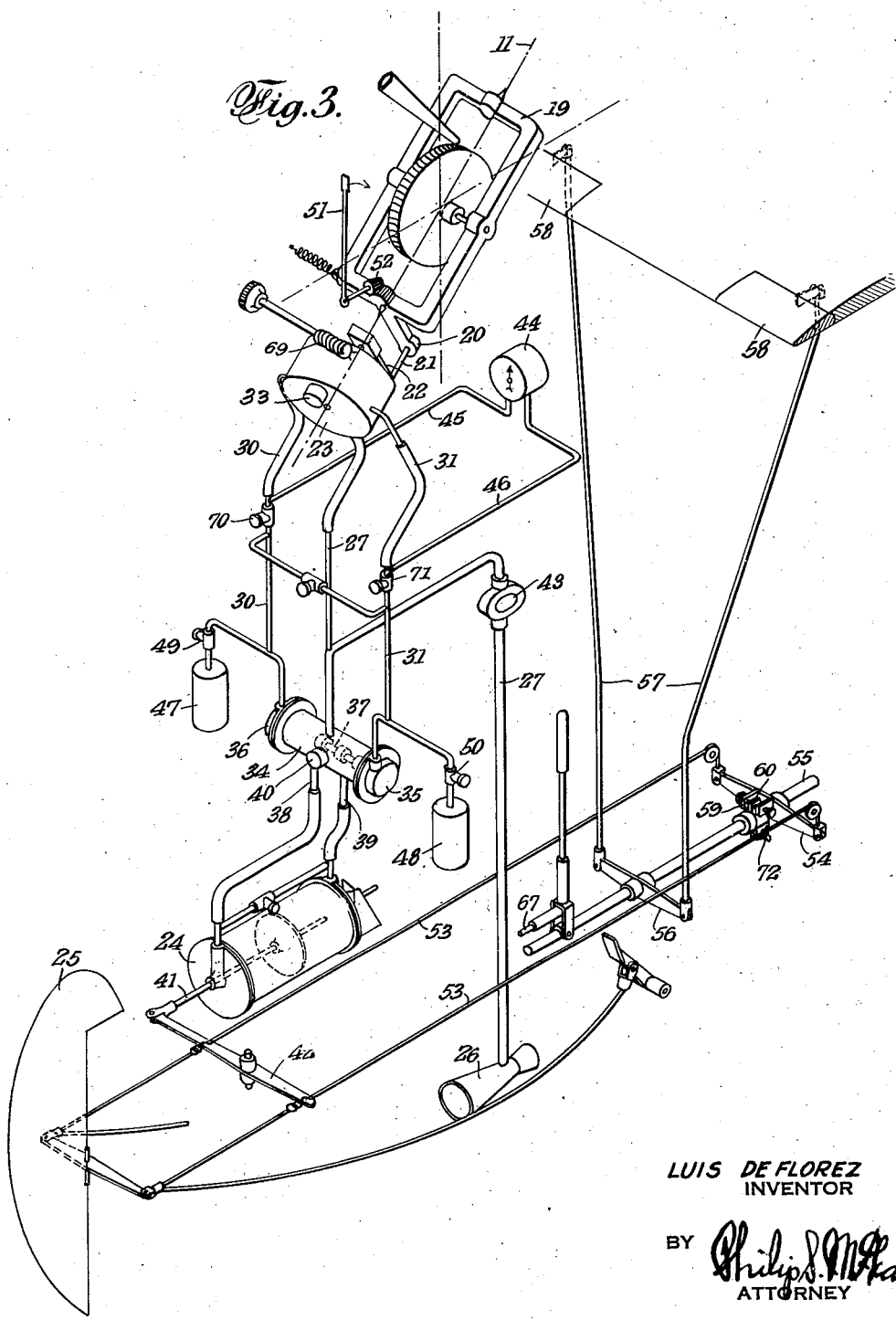

April 30, 1940. L. DE FLOREZ 2,199,256
DIRECTIONAL INDICATION AND CONTROL
Filed Sept. 27, 1937 4 Sheets-Sheet 3
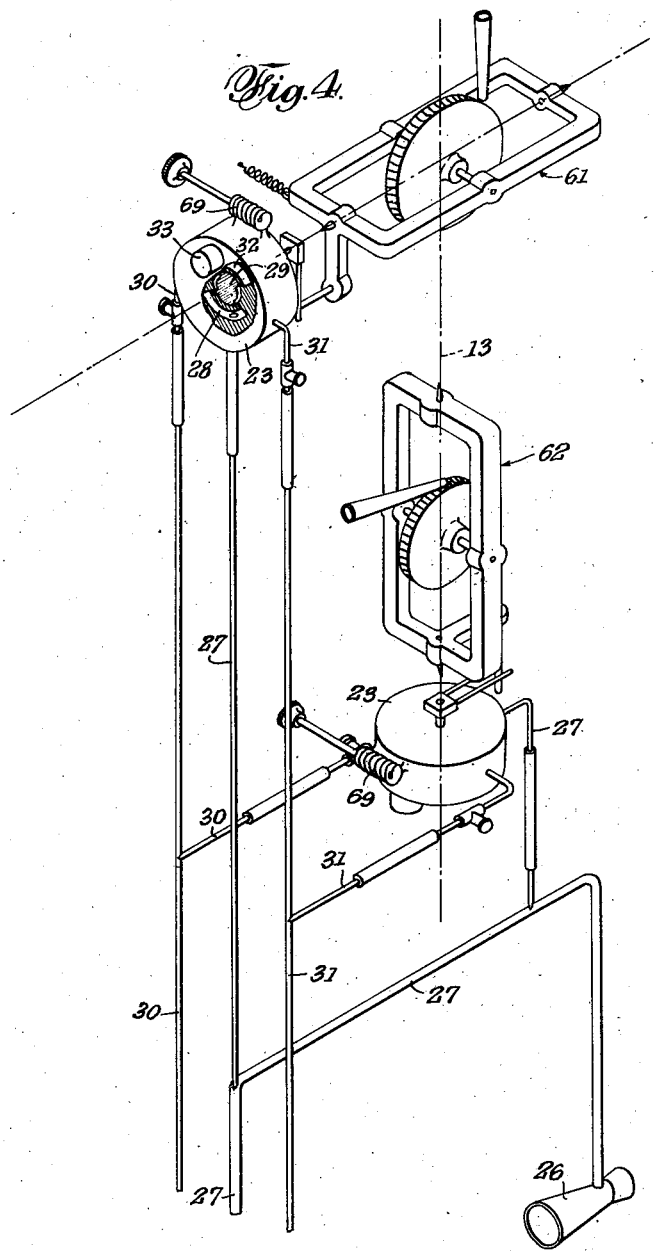
LUIS DE FLOREZ
INVENTOR

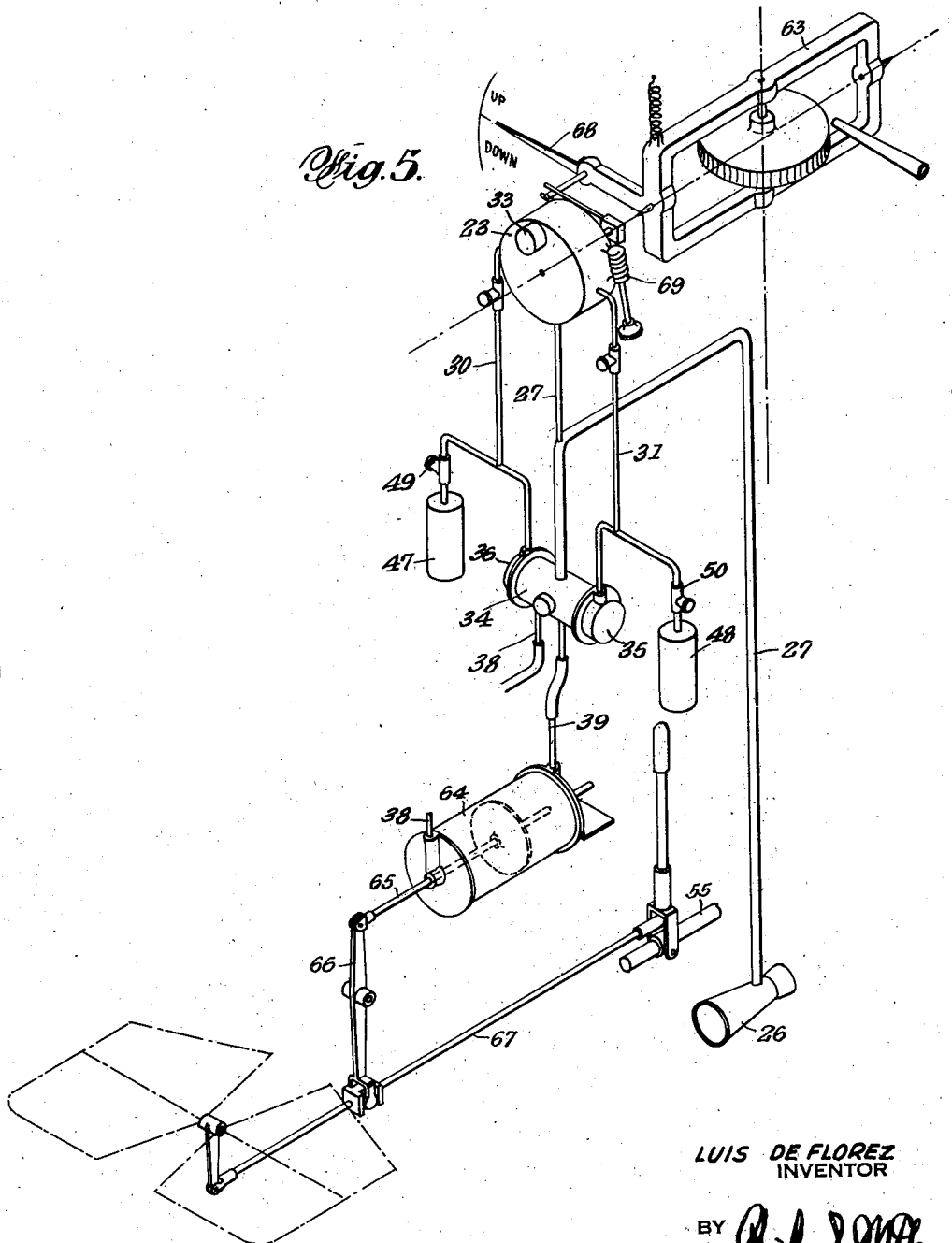

Patented Apr. 30, 1940

2,199,256

UNITED STATES PATENT OFFICE 2,199,256

DIRECTIONAL INDICATION AND CONTROL

Luis de Florez, New York, N. Y.

Application September 27, 1937, Serial No. 165,956

3 Claims. (Cl. 244—79)

The invention here disclosed relates to directional indication and control of moving craft and more particularly aircraft.

Operating in the medium they do, aircraft are susceptible to a great variety of movements, which when analyzed actually are combinations of movements about the three axes rather than true movements about any one axis. Movement about one axis also usually will have the effect of initiating movement about another axis. An example of the latter is the case of the dropping of one wing, which by the rolling movement about the longitudinal axis initiates turning movement about the normal vertical axis.

One aspect of the present invention involves the recognition of this principle and includes the provision of an instrument susceptible to such rolling movement and adapted either simply to indicate such condition or connected to institute turn correcting measures to anticipate and actually to prevent the turn which otherwise would result from such banking movement, or to effect both the indication and the control.

In one practical embodiment, a turn sensitive instrument, such as a gyroscope, is mounted on an axis inclined or at an angle to the axis of flight, instead of parallel with the longitudinal axis as the usual turn indicators are mounted, to be thus subject to transverse rolling movements and this turn sensitive device is arranged to operate an indicator or to effect the corrective control or do both.

Various alternative embodiments are disclosed and other applications of the invention are shown, for example, the operation of elevator control surfaces, as well as, or in addition to rudder control, aileron control or the like.

The objects of the invention will be appreciated from the foregoing brief statement, but specifically they may be considered as aiming to assist or to effect the proper control of craft, such as airplanes by detecting disturbances or deviations and indicating or initiating, or possibly both indicating the need for and actually initiating the corrective measures necessary to maintain the desired attitude.

Also broadly, to provide simple and entirely practical means for such purposes, applicable to existing craft.

Other desirable objects and the novel features of the invention by which the objects are attained will appear as the specification proceeds.

The drawings illustrate various practical embodiments of the invention. Such illustrations however, are primarily by way of disclosure, so it will be appreciated that various changes and modifications may be made, all within the true spirit and broad scope of the invention.

Fig. 3 is a broken and generally diagrammatic view of the parts showing the special turn sensitive instrument mounted and operating to provide both indication of the turn which will result from such banking and to apply necessary corrective measures to prevent the craft going into such turn.

Fig. 4 is a diagrammatic view illustrating a modification in which two separate gyroscopic instruments are provided—one on the horizontal axis and the other on the vertical axis and compounded or combined to accomplish similar results of in effect anticipating and preventing the plane from going into the turn which otherwise would usually follow the banking movement.

Fig. 5 is another diagrammatic representation of an embodiment of the invention applied to control of the elevator mechanism.

Figure 1:
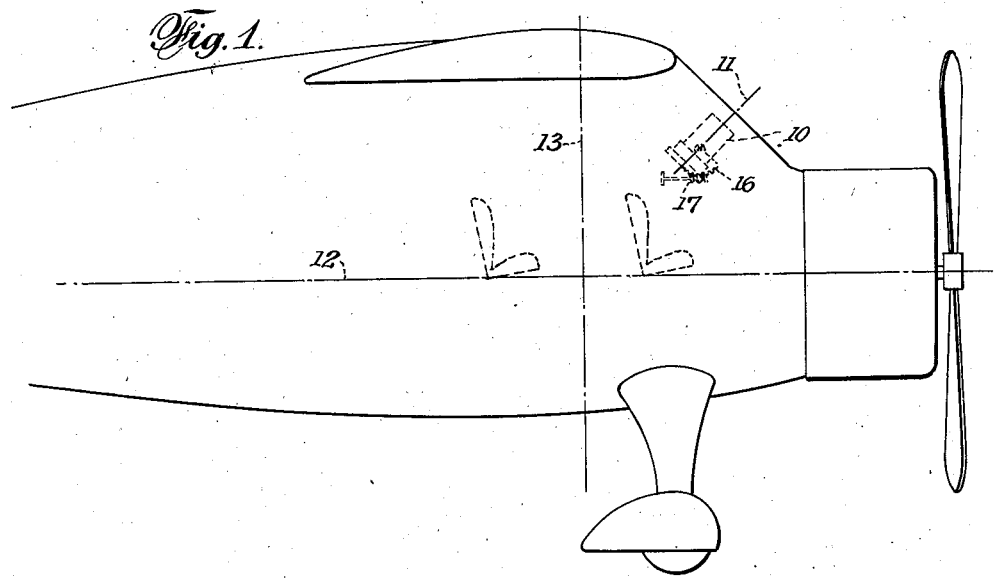
Fig. 1 is a broken side elevation illustrating conventionally application of the invention to an airplane.
Figure 2:
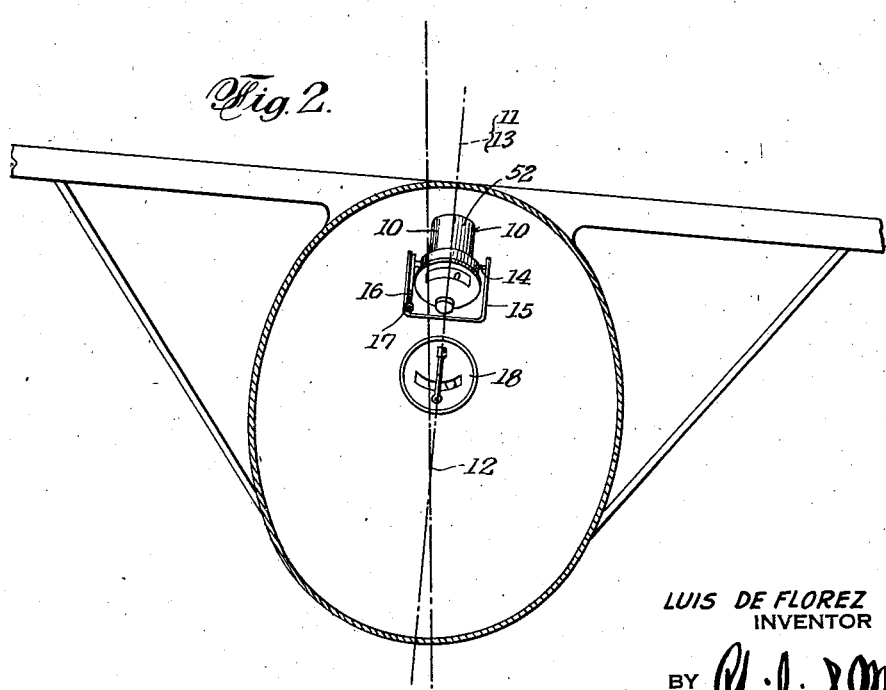
Fig. 2 is a broken transverse sectional view illustrating the special turn sensitive instrument as giving a turn indication, with a banking or rolling movement of the plane in comparative relation to a standard turn indicator giving the straight ahead indication under such circumstances.

In Figs. 1 and 2, a special turn sensitive instrument of the gyroscopic type is indicated at 10, mounted with its axis of precession on an incline 11, substantially 45° to the longitudinal and vertical axes 12, 13, of an airplane. This inclined or angled mounting may be either fixed or variable. As shown, adjustment is provided for by supporting the instrument casing on journals 14, in a bracket or base 15, and equipping it with a worm gear segment 16, engaged by a worm 17, which can be turned to vary the inclination of and secure the instrument in different angular positions.

The mounting of the gyroscope in the upwardly inclined position, instead of in the usual position substantially parallel with the axis of the ship, makes this instrument sensitive to the rolling instead of or in addition to the turning movements of the ship. The extent to which it is sensitive to roll instead of to turn depends upon the angle, it becoming more sensitive to roll with greater upward inclination. Thus with variations in the angle, the gyroscope can be made more or less sensitive to roll. It has been found that an angle somewhere in the range 30° to 45° to the longitudinal axis provides a desirable sensitiveness to rolling movements.

Used alone as an indicator, the instrument has the effect of giving a turn indication in the direction which the ship will assume as a result of a banking movement. The pilot therefore by observing this instrument, is in effect warned that a turn will follow as a result of that banking movement and can instantly correct with "top rudder," before the turn is even felt, to keep the ship straight. Thus without waiting for the turn to start, the pilot can immediately apply corrective control and thus keep the ship flying straight as it recovers or returns from the roll to level flight.

As a matter of more graphically portraying these results, there is shown in Fig. 2, a standard bank and turn indicator at 18, below the special bank-sensitive turn indicator 10, which being subject only to turn movements remains in the straight ahead indicating position. While the plane is making a roll which will cause it to fall off into a turn in the same direction, this instrument indicates correctly the existing condition, but fails to give the pilot any warning of the change to follow, whereas the inclined gyroscope in effect predicts the turn and enables the pilot to apply top rudder in time to actually prevent the turn from following.

Fig. 3 illustrates an extension of the invention to automatically effect necessary corrective control. In this view, the gyro frame 19 is shown pivoted on the inclined axis 11, and as connected through an arm 20, and pin 21, with the fork lever 22, of a sensitive control valve indicated generally at 23, for governing a power cylinder 24, connected with the rudder 25.

Pneumatic power is utilized in the present disclosure through the provision of a venturi 26, connected by piping 27, with an intermediate suction chamber 28, Fig. 4, in the casing of valve 23. The rotatable element 29, of this valve serves to open and close communication between chamber 28, and the suction lines 30, 31, at opposite sides of the same. Also this valve in a reverse sense controls communication between these lines and the chamber 32, connected with atmosphere through an air filter 33. Thus in the illustration as the valve turns right-handedly, it will close off the right hand line 31, to the atmospheric chamber 32, and open that line fully to the suction chamber 28, while opening the left-hand line 30, to the atmospheric chamber and closing off that line to the suction chamber creating more nearly suction pressure in line 31, and more nearly atmospheric pressure in line 30.

Reduction of pressure in line 31, in the illustration accomplishes reduction of pressure in the right-hand end of a relay valve 34, containing opposed diaphragms 35, 36, connected with an intermediate valve 37, which under the circumstances described, is then shifted to the right under the superior pressure acting on the left hand diaphragm 36, to connect the rearward end of the power cylinder 24, through line 38, with the suction line 27, and the forward end of the power cylinder through line 39, with atmosphere through the air filter 40. Complete details of the sensitive control valve 23 and the relay valve 37, are not shown, since these are fully disclosed in co-pending patent applications Ser. Nos. 98,352 and 139,868, it being sufficient for the present disclosure to understand that under the conditions as described, with a roll to the right, the gyroscope on the inclined axis will turn the control valve left handedly and this through the relay valve will effect application of greater power in the back end of cylinder 24, which acting through piston rod 41, and bar 42, will apply left rudder, which in this instance, will give the necessary "top rudder" effect to exert a corrective control on the plane before it can leave the straight ahead movement to enter the turn instituted by the banking movement, or in time for opposing such movement.

Conversely, upon a rolling movement of the left, the gyro will effect application of top rudder to the right to hold the ship to its course against the influence of a turn resulting from and consequent upon such a banking movement.

To maintain substantially constant pressure under all conditions of flight, an automatic pressure release valve such as indicated at 43, may be provided in the main suction line 27, usually somewhere near the venturi or other pressure source.

For indicating operation of the device through the differential pressure, a gage, such as indicated at 44, may be provided, connected by tubing 45, 46, with the differential pressure lines 30, 31.

Also shown connected with the differential pressure lines 30, 31, are the accumulator tanks 47, 48, and restrictive valves 49, 50, for modifying and graduating the control to bring the plane back to and hold it on its course without "overshooting" or "hunting."

While the differential pressure indicator 44, Fig. 3, is desirable, this is not essential, it being ordinarily sufficient for indicating purposes simply to have a rate of turn indicator, such as that shown in the form of a pointer at 51, geared or otherwise connected with the processional frame of the gyro at 52.

While it is considered that ordinarily rudder control is the most important and may be sufficient for the purposes of this invention, it is contemplated aileron control may be utilized either alone or in conjunction with rudder or other control.

In Fig. 3, conjoint rudder and aileron control is effected by connecting the rudder lines 53, with a cross bar 54, on the manual control shaft 55, carrying the cross bar 56, linked at 57 to the ailerons 58. The bar 54, actuated with the rudder is shown as carrying spaced abutment screws 59, which when desired can be set up to engage opposite sides of lug 60, fast on the control shaft 55, and which when aileron control is not desired, can be backed off so as to remain clear of lug 60.

Fig. 4 illustrates a variation of the invention, employing in place of a single gyroscope inclined to respond to both banking and turning movements, two separate gyroscopes, one at 61, in the usual relation on or parallel to the longitudinal axis to respond to turn and the other at 62, mounted on a vertical axis to respond to bank or roll. Each is connected as before described, to operate a sensitive control valve such as 23, and both such valves are connected with the suction control lines 30, 31, so as to effect joint control of the power cylinder for operating the rudder.

Fig. 5 illustrates an adaptation of the invention to elevator control. In this construction, the gyroscope 53, is located on its side with the rotational axis vertical instead of horizontal, so that it will respond to pitch and climb movements. The mechanical and pneumatic connections may be substantially the same as heretofore described, similar reference characters having been employed, the main distinction in this instance being that the power cylinder 64 is connected by piston rod 65, and rock lever 66, with the elevator rod 67.

The combined control of the two rate of turn instruments last described may be applied to rudder operation or to aileron operation, or to both rudder and aileron control.

The indicating pointer of the inclined axis rate of turn instrument illustrated in Figs. 1, 2 and 3, may be mounted to swing in a substantially vertical plane, normal to the longitudinal axis or substantially in the plane of the instrument panel, as indicated, suitable connecting gearing such as that shown at 52, being interposed to translate motion in the proper direction from the inclined precessional frame of the gyro to the more or less vertically swinging pointer. Preferably the motion of this pointer will be in the direction of bank, so that the pilot will be given a turn indication in the direction of bank and know from that that the craft has taken a roll, which if not corrected, will produce a turn in the direction indicated. Thus while it might be considered that the instrument is giving a "false" or "incorrect" indication in that it may be indicating turn when no turn has started, such indication nevertheless is of great value to the pilot, in that it forewarns that turn in that direction will start if no corrective measures are exercised.

Because of this "forewarning" character of indication, the invention is particularly helpful for so-called "blind flying" or instrument flying.

In the pitch and climb rate of turn instrument illustrated in Fig. 5, the indicating means may be in the form of a pointer 68, directly attached to the gyro frame and projecting laterally to read on a pitch and climb scale in the usual way.

The sensitive control valves employed with this invention may be equipped with worm and gear or other form of adjusting means as indicated at 69, by which the casing of the instrument may be turned relative to the valve therein to correct or compensate for operation of the parts, flexible connections or the like being interposed to permit such adjustments.

The differential pressure gage form of indicator shown at 44, in Fig. 3, is directly connected with the lines from the sensitive control valve, so as to respond quickly to this valve and thus provide immediate rate of turn indications. Restrictive valves 70, 71, are shown placed in the differential lines 30, 31, below the differential gage branch lines 45, 46, which can be set to prevent objectionable "hunting" effects in the control mechanism. These restrictions may be in addition to or in place of the restrictive valves 49, 50, and the accumulator tanks 47, 48, may or may not be used either with or without the restrictive valves described.

To enable quick disconnection of the aileron control shown in Fig. 3, the lug 60, on the control shaft 55, may be releasably secured as by mounting it on a split collar 72, held by a wing nut. This permits of entire disconnection of aileron control or, with the clamp tightened and the abutment screws 59 loosened somewhat, a certain amount of lag or free motion between the rudder action and the operation of the ailerons.

What is claimed is:

1. In combination with an aircraft of the type in which roll about the longitudinal axis, effecting the lowering of a wing, will occasion turning of the craft about a vertical axis, a rate of turn gyroscope having one degree of freedom and confined to movement about only the precessional axis, said gyroscope comprising a precessional frame pivoted on an axis fixed in a longitudinal plane of the craft and a rotor journalled in said frame on a substantially transverse normally horizontal axis and spinning at all times in a general fore and aft direction, substantially in the line of flight, with the axis of rotation at all times substantially transverse to the direction of flight and substantially horizontal in normal flight, said precessional frame being fixed with its axis of movement substantially in the vertical plane of symmetry of the craft or substantially parallel thereto and fixed on an incline sloping upwardly and forwardly of the longitudinal axis of the craft, so that roll of the craft about the longitudinal axis, as in the lowering of a wing, will occasion only precession of said frame transversely about said upwardly and forwardy inclined precessional axis as a center substantially without swinging said rotor off to the side from the fore and aft direction in which it spins in normal flight and whereby said gyroscope is maintained at all times most sensitive to roll, means related to turn of the craft about vertical axis, and constant operating connections from said frame for effecting operation of said means in proportion to precession of said frame from roll of the craft about the longitudinal axis.

2. In combination with an aircraft of the type in which roll about the longitudinal axis, effecting the lowering of a wing, will occasion turning of the craft about a vertical axis, a rate of turn gyroscope having one degree of freedom and confined to movement about only the precessional axis, said gyroscope comprising a precessional frame pivoted on an axis fixed in a longitudinal plane of the craft and a rotor journalled in said frame on a substantially transverse normally horizontal axis and spinning at all times in a general fore and aft direction, substantially in the line of flight, with the axis of rotation at all times substantially transverse to the direction of flight and substantially horizontal in normal flight, said precessional frame being fixed with its axis of movement substantially in the vertical plane of symmetry of the craft or substantially parallel thereto and fixed on an incline sloping upwardly and forwardly of the longitudinal axis of the craft, so that roll of the craft about the longitudinal axis, as in the lowering of a wing, will occasion only precession of said frame transversely about said upwardly and forwardly inclined precessional axis as a center substantially without swinging said rotor off to the side from the fore and aft direction in which it spins in normal flight and whereby said gyroscope is maintained at all times most sensitive to roll, control means for effecting turn of the craft about vertical axis, and constant operating connections from said precessional frame for initiating operation of said control means to prevent turn about vertical axis which normally would follow upon wing lowering movement of the craft about longitudinal axis.

3. In combination with an aircraft of the type in which roll about the longitudinal axis, effecting the lowering of a wing, will occasion turning of the craft about a vertical axis, a rate of turn gyroscope having one degree of freedom and confined to movement about only the precessional axis, said gyroscope comprising a precessional frame pivoted on an axis fixed in a longitudinal plane of the craft and a rotor journalled in said frame on a substantially transverse normally horizontal axis and spinning at all times in a general fore and aft direction, substantially in the line of flight, with the axis of rotation at all times substantially transverse to the direction of flight and substantially horizontal in normal flight, said precessional frame being fixed with its axis of movement substantially in the vertical plane of symmetry of the craft or substantially parallel thereto and fixed on an incline sloping upwardly and forwardly of the longitudinal axis of the craft, so that roll of the craft about the lonigtudinal axis, as in the lowering of a wing, will occasion only precession of said frame transversely about said upwardly and forwardly inclined precessional axis as a center substantially without swinging said rotor off to the side from the fore and aft direction in which it spins in normal flight and whereby said gyroscope is maintained at all times most sensitive to roll, means operable from said precessional frame, and constant operating connections from said axially inclined precessional frame to said means for actuating the latter at all times in accordance with movements only of said precessional frame about said inclined axis occasioned by wing lowering movement about the longitudinal axis of the craft.

LUIS DE FLOREZ.